July 18, 1967     G. J. YOUNG     3,331,703
FUEL CELL SYSTEM
Filed Jan. 27, 1961
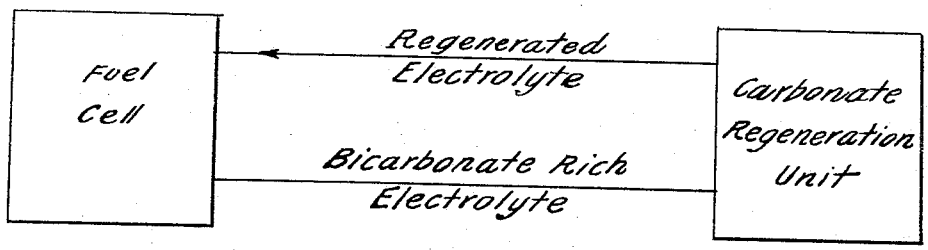
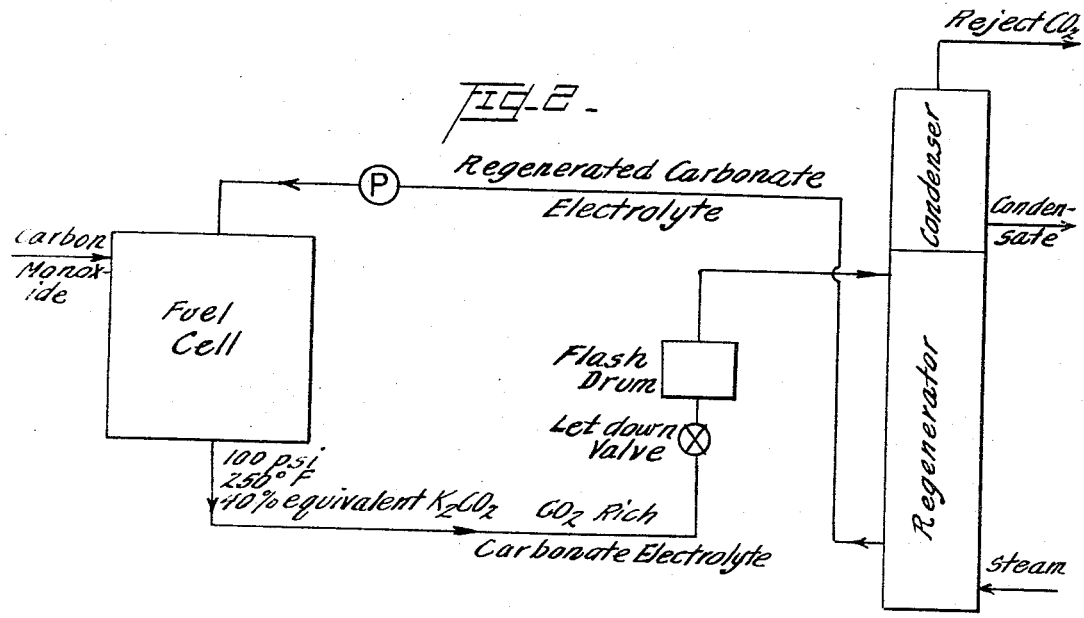
INVENTOR
George J. Young
BY Watson, Cole, Grindle & Watson
ATTORNEYS

United States Patent Office 3,331,703
Patented July 18, 1967

3,331,703
FUEL CELL SYSTEM
George J. Young, Alfred, N.Y., assignor to Leesona Corporation, Cranston, R.I., a corporation of Massachusetts
Filed Jan. 27, 1961, Ser. No. 85,281
1 Claim. (Cl. 136—86)

This invention relates to improved fuel cells and more particularly to a fuel cell which employs an aqueous carbonate electrolyte, operated in combination with a carbonate regeneration process.

A "fuel cell" for purposes of this specification, is understood to be an electrochemical cell in which the free energy of combustion of the fuel cell is converted directly into electrical energy. In constructing an efficient fuel cell, the problem encountered is basically one of chemical kinetics with the object being to carry out the reaction of the fuel gas and oxidizing gas in a manner so that the proportion of free energy degraded into heat is as small as possible. Yet, it is necessary that the activity of the cell be sufficiently high so that the energy output from practical sized cells can be economically attained.

To obtain these results the cell must have a high and unimpeded electron reactivity and as nearly as possible complete oxidation of the fuel. Further, the fuel cell system must remain at least substantially invariant, inasmuch as a cell can function as an efficient energy converter only if it undergoes no significant progressive change.

One of the more critical areas in which to maintain invariancy is in the electrolyte. In the early prior art, work in the electrolyte area was directed primarily toward the use of solid and fused electrolytes, such as the alkaline and alkaline earth carbonates as well as alkaline hydroxides. More recently, in the development of low and medium temperature fuel cells, aqueous electrolytes of alkaline carbonates and hydroxides including eutectic mixtures of the hydroxides have received considerable attention. In the process of dissociation, the strongly basic materials produce large numbers of ions which readily transfer oxygen ions to the fuel electrode where reaction occurs. It is, of course, necessary when the electrolyte undergoes chemical change through the reaction with the fuel gas or oxidation by the oxidizing gas to replenish or exchange the electrolyte in order to maintain the high activity and corresponding high current density of the fuel cell.

A particularly serious problem is encountered with the carbonaceous fuels since carbon dioxide is produced as a byproduct. Since from economic considerations, these fuels or products easily derived from them are the best choice of energy source for fuel cells, it is particularly desirable to have an electrolyte which can be employed with the carbonaceous fuels. However, to achieve the most advantageous use efficiency for such fuels, the fuel cell should be capable of oxidizing carbon containing compounds to carbon dioxide. This means that the electrolyte employed in the fuel cell must be able to perform satisfactorily in the presence of carbon dioxide and at the same time a suitable process must be devised for the removal of carbon dioxide and other reaction products from the cell. In addition to the use of carbonaceous fuels, many other examples exist where a fuel cell might be required to operate with carbon dioxide present, e.g. when air is used as the oxidant gas or when gases containing carbon dioxide are used as the fuel source. In all such cases it is necessary that the electrolyte, in effect, be invariant for the overall process and thus, means must be provided for the removal of carbon dioxide from the cell.

It has been demonstrated (Young, G. J., Fuel Cells, New York, Reinhold Publishing Corp., 1960) that aqueous carbonate electrolytes (for example potassium carbonate) satisfactorily perform in fuel cells using either air or oxygen as the oxidant and using a variety of fuel gases. However, in the presence of carbon dioxide, carbonate ions in such electrolytes generally are converted to bicarbonates, $$H_2O + CO_3^= + CO_2 \rightarrow 2HCO_3^=$$

In this case, the electrolyte is not invariant since the net reaction involving the electrolyte is to produce bicarbonate ions. While it is possible to operate a fuel cell at such temperatures and pressure that the bicarbonate either is not formed or is decomposed rapidly, this presents the problem of removal of the carbon dioxide from the cell. The latter problem is serious since the carbon dioxide concentration would rapidly build up in the gas compartments and result in severe concentration polarization.

Accordingly, the present invention provides a fuel cell system in which carbon dioxide is present and employs an aqueous carbonate electrolyte in such a manner that the bicarbonate formed as a result of the reaction between the carbon dioxide and the carbonate electrolyte is decomposed either outside the cell or in a special compartment within the cell. This, in effect, maintains the electrolyte invariant and at the same time serves as a means for removing carbon dioxide from the cell.

Specifically, a fuel cell is provided which employs an aqueous carbonate electrolyte and is operated in conjunction with a carbonate regeneration process as illustrated in FIGURE 1 of the flow sheet. In the process, the electrolyte is continuously circulated in order that the electrolyte from the cell which is more concentrated in bicarbonate ions is passed to the regeneration unit where carbon dioxide is removed and bicarbonate ions converted back to carbonate ions.

A typical unit, as illustrated in FIG. 2 of the flow sheet, is constructed based on a 10,000 kw. output. The unit is operated employing carbon monoxide as the fuel at 100 p.s.i. gage and 250° F., a 40% aqueous potassium carbonate electrolyte, and oxygen as the oxidant. The fuel cell system employs a nickel activated carbon electrode at the anode and a carbon plate electrode at the cathode.

465 pound moles carbon monoxide are pumped into the fuel gas side of the fuel cell per hour where oxidation occurs producing carbon dioxide which is absorbed in the potassium carbonate electrolyte. The electrolyte rich in carbon dioxide is drawn from the cell at a rate of approximately 55,667 gallons per hour and circulated through the carbonate regeneration unit. After carbon dioxide is removed, the electrolyte is returned to the fuel cell unit. The regenerated electrolyte is pumped into the fuel cell at substantially the operating temperature of the cell. The fuel cell unit has a daily capacity of approximately 250 tons based on the carbon dioxide capacity.

The instant invention is not concerned with the regeneration unit per se, such units having been described in the literature, for example, Benson, H. E. and Field, J. H. Petroleum Refiner, 39, 127 (1960) and Benson, H. E., Field, J. H., and Jimeson, R. M. Chemical Engineering Progress, 50, 356 (1954). The units described in the literature, or modifications thereof, can be used in the instant invention. However, the unit set forth in FIGURE 2 of the flow sheet which comprises a let down valve for depressurizing the carbon dioxide rich carbonate electrolyte, a flash drum for flashing off free carbon dioxide from the carbonate solution before passing it into the top of the regenerator where the remaining carbon dioxide is stripped by steam generated at the bottom of the column, is one unit operable in the present invention. The regenerated electrolyte is pumped from the regeneration unit to the fuel cell by means of a suitable pump. As stated hereinbefore, temperature lost in the regeneration of the electrolyte is kept at a minimum, and therefore, a heater for reheating the electrolyte is usually not necessary.

It is appreciated that in the instant invention, it is possible to construct a unit wherein the regeneration unit is an integral part of the fuel cell housing and such units, their construction being within the ability of one skilled in the art in view of the instant teaching, are embraced herein. Additionally, the instant invention is applicable to any fuel cell system where an aqueous carbonate electrolyte is employed capable of absorbing carbon dioxide, regardless of the source of the carbon dioxide gas. For example, the carbon dioxide can be formed on the oxidant side as well as the fuel gas side of the fuel cell. Additionally, as is apparent, the cell can be operated at temperatures usually employed with aqueous electrolytes, as for example, from 20–350° C. depending on the pressure of the cell. Preferred temperatures, however, are from 20–125° C. at pressure of 1–20 atmospheres. Additionally, conventional electrodes and fuels can be utilized. These features are not critical in the instant invention.

Having thus provided a written description of the present invention and provided a specific example thereof, it should be understood that no undue restrictions or limitations are to be imposed by reason thereof but that the present invention is defined by the appended claims.

It is claimed:

In combination, a fuel cell for generating electricity directly from a fuel and oxidant comprising a cathode, an anode, and aqueous carbonate electrolyte, said fuel cell, in the production of electricity, liberating carbon dioxide into said aqueous electrolyte, and a regenerator unit for removal of carbon dioxide from an aqueous solution, said fuel cell and regenerator unit being in operable association including means for passing said electrolyte containing dissolved carbon dioxide from said fuel cell to said regenerator unit, comprising a let-down valve for depressurizing the carbon dioxide saturated carbonate electrolyte, and a flash drum for flashing off free carbon dioxide from the carbonate electrolyte before passing the electrolyte into the top of the regenerator unit where the remaining carbon dioxide is stripped by steam generated at the bottom of the generator and means for returning said electrolyte to said fuel cell after passing said electrolyte through said regenerator unit.

References Cited
UNITED STATES PATENTS

| | | | |
|---|---|---|---|
| 2,384,463 | 9/1945 | Gunn et al. | 136—86 |
| 3,082,282 | 3/1963 | Gruneberg et al. | 136—86 |

WINSTON A. DOUGLAS, *Primary Examiner.*

JOHN R. SPECK, JOHN H. MACK, *Examiners.*

H. FEELEY, *Assistant Examiner.*